United States Patent
Maylander et al.

(10) Patent No.: US 9,930,090 B2
(45) Date of Patent: Mar. 27, 2018

(54) OPTIMIZING TRANSFER TO A REMOTE ACCESS CLIENT OF A HIGH DEFINITION (HD) HOST SCREEN IMAGE

(71) Applicant: LogMeIn, Inc., Boston, MA (US)

(72) Inventors: Gabor Maylander, Budapest (HU); Marton B. Anka, Boston, MA (US)

(73) Assignee: LogMeIn, Inc., Boston, MA (US)

( * ) Notice: Subject to any disclaimer, the term of this patent is extended or adjusted under 35 U.S.C. 154(b) by 0 days.

(21) Appl. No.: 15/356,841

(22) Filed: Nov. 21, 2016

(65) Prior Publication Data

US 2017/0070556 A1 Mar. 9, 2017

Related U.S. Application Data

(63) Continuation of application No. 13/709,294, filed on Dec. 10, 2012, now Pat. No. 9,503,497.

(60) Provisional application No. 61/569,229, filed on Dec. 10, 2011.

(51) Int. Cl.
*G06F 15/16* (2006.01)
*H04L 29/06* (2006.01)
*H04N 21/2662* (2011.01)

(52) U.S. Cl.
CPC ............ *H04L 65/607* (2013.01); *H04L 65/80* (2013.01); *H04N 21/2662* (2013.01)

(58) Field of Classification Search
CPC .... H04L 65/607; H04L 65/80; H04N 21/2662
See application file for complete search history.

(56) References Cited

U.S. PATENT DOCUMENTS

| | | | | | |
|---|---|---|---|---|---|
| 6,040,861 A | * | 3/2000 | Boroczky | ............ | H04N 19/176 370/276 |
| 6,182,265 B1 | * | 1/2001 | Lim | ...................... | H03M 13/23 714/786 |
| 7,116,833 B2 | * | 10/2006 | Brower | .................. | H04N 19/63 375/240.11 |
| 8,649,426 B2 | * | 2/2014 | White | .................... | H04N 7/147 375/240.01 |
| 2004/0008767 A1 | * | 1/2004 | Ueda | .................... | H04N 9/8042 375/240.01 |
| 2005/0058200 A1 | * | 3/2005 | Lu | .......................... | H04N 19/15 375/240.12 |
| 2005/0091311 A1 | * | 4/2005 | Lund | ................ | G08B 13/19656 709/203 |

(Continued)

*Primary Examiner* — Jonathan Bui
(74) *Attorney, Agent, or Firm* — David H. Judson (57) ABSTRACT

A host-client protocol facilitates delivery of screen images from a host to a remote access client when the host content is continuous or large (such as high definition (HD) content). To facilitate this operation, the protocol implements several functions and operations that provide the desired result of an HD stream viewable on the remote access client. These functions and operations include one or more of: frame rate adjustment, rate control, dynamic adjustment to the stream based on client-provided screen resolution or changes, eliminating portions of the host screen that are not in view on the remote access client, implementing client-initiated zoom/pan operations on the host instead of the client, performing zoom/pan operations, dynamic control over screen updates, and (where multiple clients are receiving the stream) delivering streams to different clients at different frame rates.

11 Claims, 8 Drawing Sheets

(56) References Cited

U.S. PATENT DOCUMENTS

| | | | |
|---|---|---|---|
| 2005/0207664 A1* | 9/2005 | Ramasastry | H04N 19/63 382/240 |
| 2006/0095401 A1* | 5/2006 | Krikorian | H04N 21/4398 |
| 2006/0274831 A1* | 12/2006 | Fernandez | H04N 19/61 375/240.12 |
| 2008/0104652 A1* | 5/2008 | Swenson | H04L 47/10 725/118 |
| 2009/0141809 A1* | 6/2009 | Visharam | H04N 19/61 375/240.25 |
| 2010/0067571 A1* | 3/2010 | White | H04N 7/147 375/240.01 |
| 2011/0007798 A1* | 1/2011 | Pun | H04N 19/197 375/240.03 |
| 2011/0032986 A1* | 2/2011 | Banger | H04N 21/23436 375/240.07 |
| 2011/0302334 A1* | 12/2011 | Ponnatota | H04L 12/40136 710/30 |
| 2012/0051436 A1* | 3/2012 | Chen | H04N 21/23406 375/240.25 |
| 2012/0079329 A1* | 3/2012 | Steinbach | H04N 19/176 714/704 |
| 2012/0086815 A1* | 4/2012 | Cooper | H04N 1/00204 348/207.1 |
| 2012/0140816 A1* | 6/2012 | Franche | H04N 19/172 375/240.03 |
| 2013/0246576 A1* | 9/2013 | Wogsberg | H04N 7/181 709/219 |

\* cited by examiner

OPTIMIZING TRANSFER TO A REMOTE ACCESS CLIENT OF A HIGH DEFINITION (HD) HOST SCREEN IMAGE

BACKGROUND

Technical Field

This disclosure relates generally to remote access technologies that enable users of Internet-accessible devices to access and view content over a network.

Background of the Related Art

Remote access technologies, products and systems enable a user of a remote computer to access and control a host computer over a network. Internet-accessible architectures that provide their users with remote access capabilities (e.g., remote control, file transfer, display screen sharing, chat, computer management and the like) also are well-known in the prior art. Typically, these architectures are implemented as a Web-based "service," such as LogMeIn, GoToMyPC, WebEx, Adobe Connect, and others. An individual (or subscriber) who uses the service has a host computer that he or she desires to access from a remote location. Using the LogMeIn service, for example, the individual can access his or her host computer using a client computer that runs web browser software.

Mobile devices, such as a smartphone or tablet (e.g., Apple iPhone® and iPad® tablet), have become ubiquitous in today's society. Faster processors, more memory, higher quality gesture-based multi-touch screens, availability of mobile broadband data, and integration of multi-media and GPS chips along with open interface mobile operating systems have opened the door for creation of a large variety of mobile applications. One such mobile application is LogMeIn Ignition, a remote access application by which the user of the device can remotely access, control and manage a host computer that maintains a connection to a Web-based remote access service.

Transferring screen images from a host to a remote access client (especially an iOS- or Android-based mobile device) can present significant technical challenges when the host content is continuous or large, e.g., a movie, a YouTube® video, an interactive game, or the like. Yet, a remote access user desires such content to be highly available on the remote access client irrespective of network congestion, video frame rate, processing requirements, and the like.

BRIEF SUMMARY

This disclosure provides a host-client protocol (a suite of one or more technologies) to facilitate delivery of screen images from a host to a remote access client when the host content is continuous or large, including high definition (HD) content. To facilitate this operation, the protocol described herein implements several functions or control operations that, working alone or (preferably) together, provide the desired result of an HD stream viewable on the remote access client. These functions and operations include one or more of: frame rate adjustment, rate control, dynamic adjustment to the stream based on client-provided screen resolution or changes, eliminating portions of the host screen that are not in view on the remote access client, implementing client-initiated zoom/pan operations on the host instead of the client, performing zoom/pan operations, dynamic control over screen updates, and (where multiple clients are receiving the stream) delivering streams to different clients at different frame rates. It is not required that every feature or function be implemented, although typically the performance is improved if a majority (or even all of the techniques) are used.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

According to one embodiment of this disclosure, a mobile device user operates as a remote access "client" and desires to access and view a "resource" of the user's host computer(s) that maintain (or can be controlled to initiate) connection(s) to a Web-based remote access architecture. A representative "resource" may be a Flash®-based video, a movie, a game, a movie being delivered from a commercial site such as Netflix®, or the like. This is not a limitation, however. To this end, the mobile device includes a remote access client application, such as LogMeIn Ignition™, which is augmented to provide the functionality described herein. The client application may be downloaded and installed via a mobile application delivery service, such as the Apple® App™ Store, Android™ Market (or equivalents).

Figure 1:
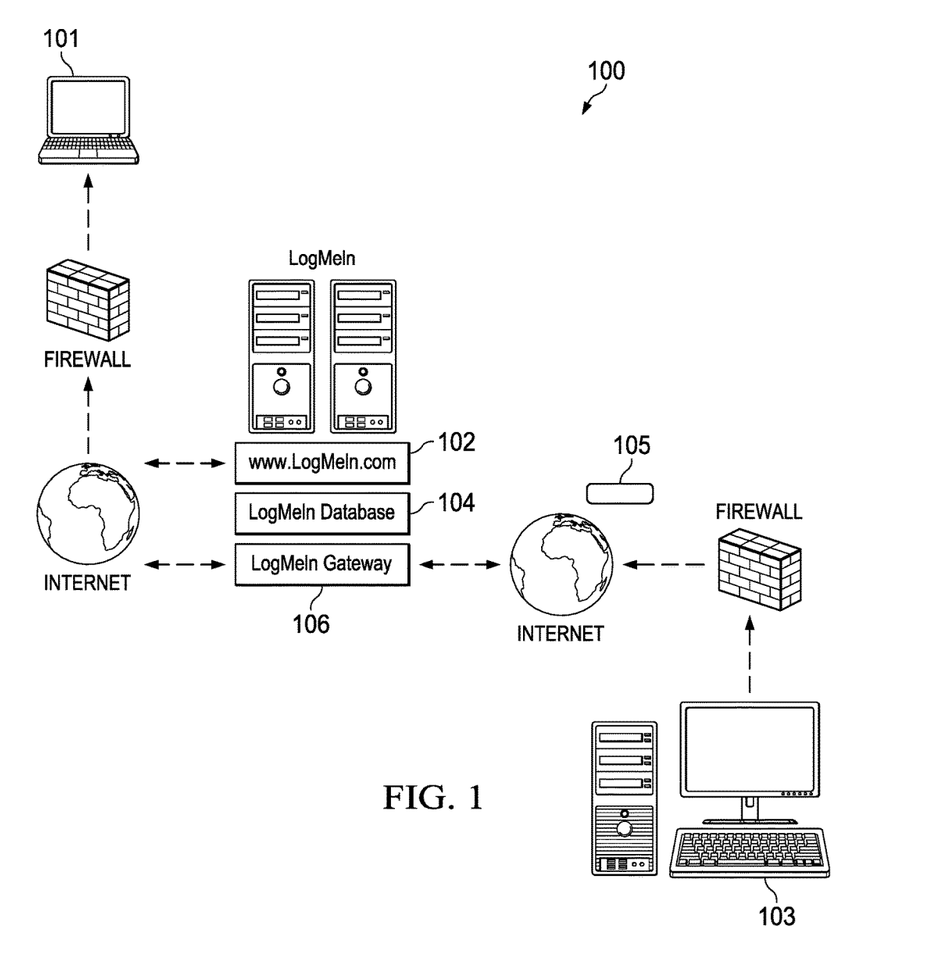
FIG. 1 depicts an extensible Web-based remote access architecture in which exemplary aspects of the file transfer method may be implemented.

FIG. 1 illustrates a high level view of a remote access architecture 100 in which the disclosed technique may be practiced. This architecture is merely representative, and it should not be taken as limiting. Preferably, the architecture comprises "n-tiers" that include a web server tier 102, a database tier 104, and a gateway tier 106. The web server tier 102 comprises a plurality of machines that each executes web server software. The web server tier provides an Internet-accessible web site. Preferably, the web site associated with a site domain (however designated) is available from multiple locations that collectively comprise the web server tier 102. The database tier 104 comprises a plurality of machines that each executes database server software. The database tier provides a network-accessible data storage service for generating and storing data associated with end user sessions to the remote access service. The gateway tier 106 comprises a plurality of machines that each executes application server software. The gateway tier provides a network-accessible connection service for establishing and maintaining connections between and among the participating end user computers. Although not shown, preferably end user computers connect to the gateway servers over secure connections, e.g., over SSL, TLS, or the like. A representative machine on which the web server, database server or gateway server executes comprises commodity hardware (e.g., one or more processors) running an operating system kernel, applications, and utilities.

Figure 4:
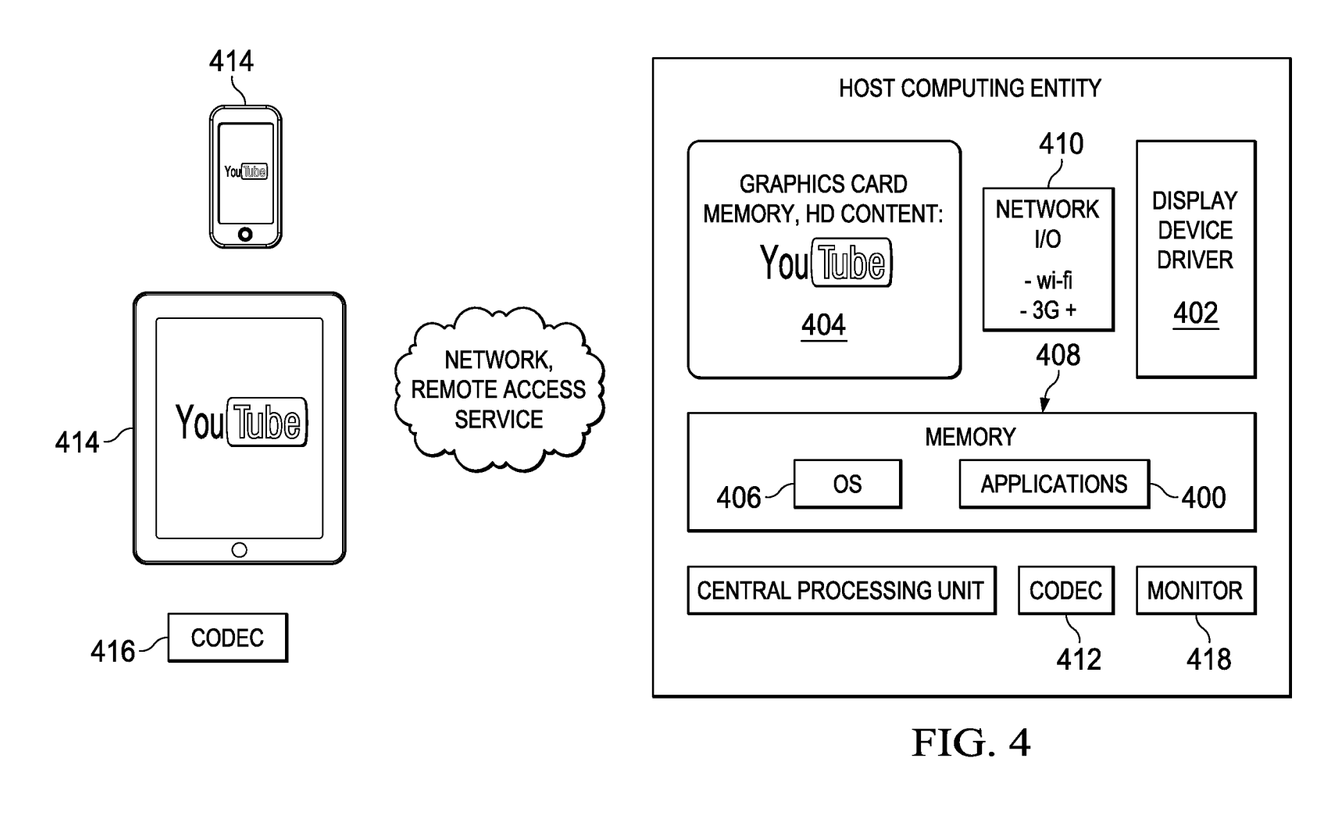
FIG. 4 is a block diagram of various hardware and software elements of the host computing entity.

As seen in FIG. 4, which illustrates a portion of the host hardware and software, the host software 400 has the capability of obtaining screen images, typically by accessing the host computer display device driver 402 and the video graphics card memory 404. Under the control of the host operating system 406, the host software 400 is capable of transferring a bitmap (the display screen image) from the graphics card memory 404 to system memory 408 for encoding, with the resulting encoded frames then provided to the network I/O card 410 for delivery to the remote access client. The host includes or has associated therewith appropriate codec software 412 to encode the captured screen image. The remote access client 414 also includes the codec software 416, which is used there to decode and render each encoded frame generated on the host side of the connection. The encode/decode pipeline is well-known, and typically it involves the following ordered steps: GRAB (capture a screen image), YUV (transcode RGB bitmap into YUV color space), ENC (encode the frame), NET (send the encoded frame to the client), DEC (decode the frame), RGB (transcode YUV image to RGB), and DRW (draw the resulting bitmap to the client's screen).

The host also includes routines 418 that monitor the network I/O card 410 for network congestion, and that operate to receive control data from the remote access client 414. Among other things, this control data reports the time taken by the remote access client to decode a last frame received by the remote access client.

Figure 2:
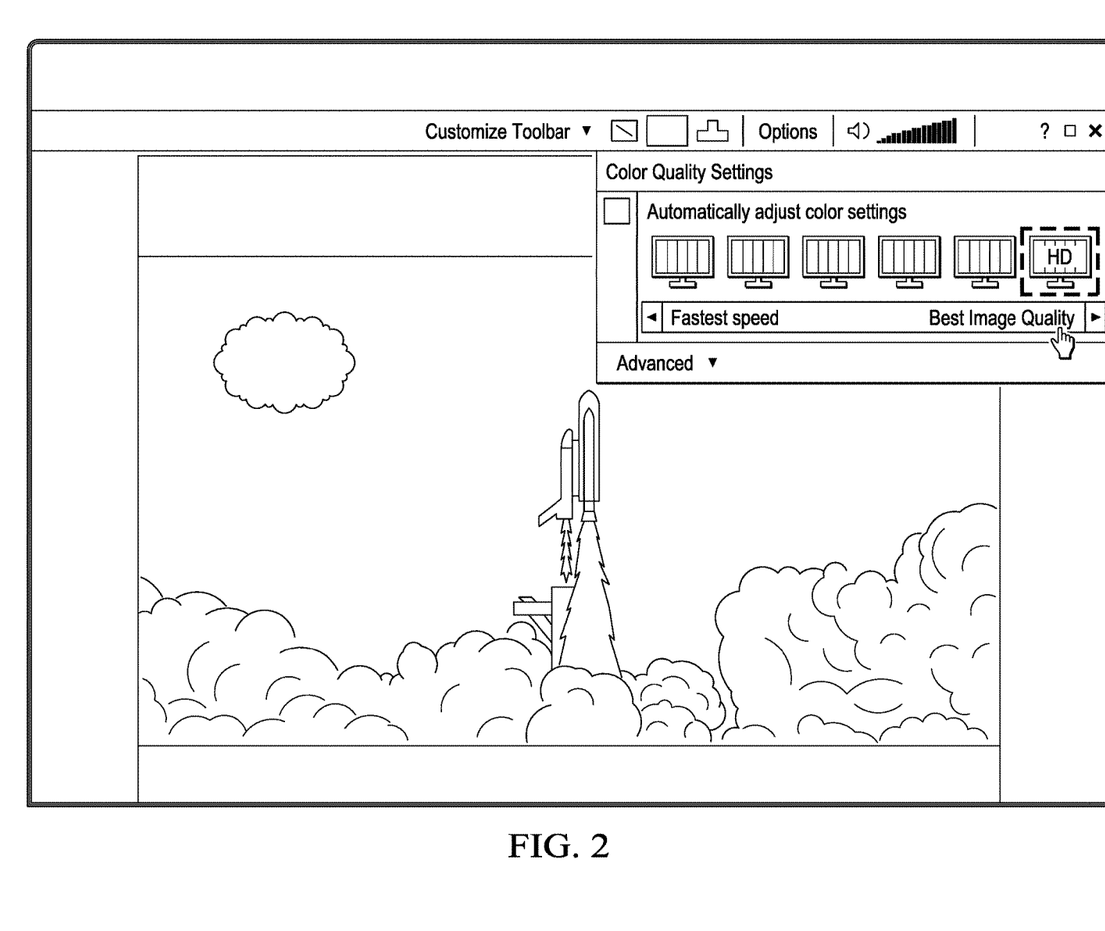
FIG. 2 is an illustrative use case in which a mobile device user desires to access and view a "streaming" resource from one to another of his or her host computers that maintain connections to the Web-based remote access architecture in FIG. 1.

An illustrative use case is one in which a mobile device user desires to access and view a "streaming" resource from one to another of his or her host computers that maintain connections to the Web-based remote access architecture in FIG. 1. As noted above, the mobile device includes a remote access client application to facilitate this operation. In this example, the mobile device is an Apple iPad® or iPad2, iPad Mini, an Android™-based smartphone or tablet, a Windows®-based smartphone or tablet, or the like, and the end user desires to access and view a resource from a host computer that is then-connected or connectable to the remote access service. Screen images (from the host to the mobile device) may be delivered via an intermediary or peer-to-peer. This scenario is illustrated in FIG. 2.

Figure 3:
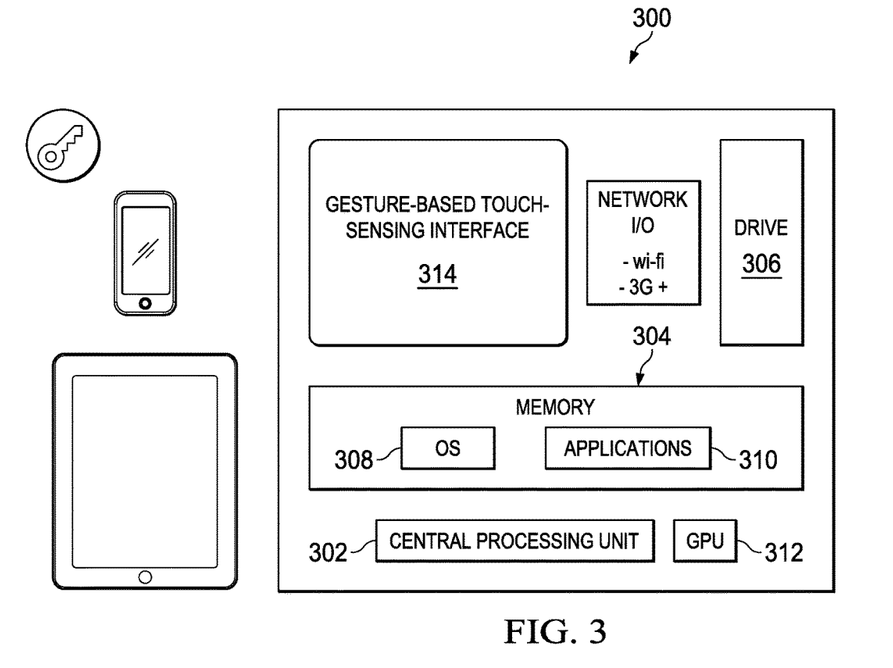
FIG. 3 is an exemplary block diagram of a mobile device in which the streaming remote control method of the disclosure is implemented.

Preferably, the mobile device is a smartphone or tablet, such as the iPhone® or iPad®, but this is not a limitation. As seen in FIG. 3, the device 300 comprises a CPU (central processing unit) 302, such as any Intel- or AMD-based chip, computer memory 304, such as RAM, and a drive 306. The device software includes an operating system (e.g., Apple iOS, Google® Android™, or the like) 308, and generic support applications and utilities 310. The device may also include a graphics processing unit (GPU) 312. In particular, the mobile device also includes a touch-sensing device or interface 314 configured to receive input from a user's touch and to send this information to processor 312. The touch-sensing device typically is a touch screen. The touch-sensing device or interface 314 recognizes touches, as well as the position, motion and magnitude of touches on a touch sensitive surface (gestures). In operation, the touch-sensing device detects and reports the touches to the processor 312, which then interpret the touches in accordance with its programming. Typically, the touch screen is positioned over or in front of a display screen, integrated with a display device, or it can be a separate component, such as a touch pad. The touch-sensing device is based on sensing technologies including, without limitation, capacitive sensing, resistive sensing, surface acoustic wave sensing, pressure sensing, optical sensing, and/or the like.

The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The remote access client is not limited to a mobile device, as it may be a conventional desktop, laptop or other Internet-accessible machine running a web browser.

HD Over Remote Control

As described above, a high definition (HD) content delivery method according to this disclosure is operative in a mobile computing device, such as shown in FIG. 3, having a display interface that supports gesture-based control operations. This type of remote access client is not a limitation, however.

The mobile computing device includes a remote access client, such as LogMeIn Ignition, that has been augmented to provide the described functionality. One or more other computers associated with or accessible to the user each maintain connections to a Web-based remote access service, such as LogMeIn®, as illustrated in FIG. 1. In a typical use case, such as described above with respect to FIG. 2, the user desires to access and view a streaming resource between first and second of his or her connected or associated computers, although this is not a limitation, as the user may simply want to "view" the resource (playing on the host) on the mobile device itself. An example (but non-limiting) scenario is the end user with a mobile device at an airport accessing (over 3G or higher, or local Wi-Fi) his or her (remote access service-connected) host computer located at the user's home or office, with a YouTube® hosted video running on the host computer. The streaming protocol described below enables the end user to experience the video on the mobile device as if he or she were watching on the host, irrespective of the fact of remote access, the existence of network congestion, processing and storage limitations at either end of the connection, and the like.

Protocol Details

As described above with respect to FIG. 4, the host transfers screen images to the remote access client using a standard video encoder/decoder infrastructure and format (e.g., H.264, VP8, or the like). Preferably, this standard delivery paradigm is augmented with several additional features/functions to provide robust, highly-available and reliable high definition (HD) delivery over a network connection that may be unreliable. The end user of the remote access client perceives the content as if it were being rendered locally (although it is actually being rendered on the host and then transferred over the potentially unreliable network connection to the client).

To facilitate this operation, the protocol described herein implements several functions or control operations that, working alone or (preferably) together, provide the desired result of an HD stream viewable on the remote access client. As will be described, these functions and operations include one or more of: frame rate adjustment, rate control, dynamic adjustment to the stream based on client-provided screen resolution or changes, eliminating portions of the host screen that are not in view on the remote access client, implementing client-initiated zoom/pan operations on the host instead of the client, performing zoom/pan operations, dynamic control over screen updates, and (where multiple clients are receiving the stream) delivering streams to different clients at different frame rates. It is not required that every feature or function be implemented, although typically the performance is improved if a majority (or even all of the techniques) are used.

Each of the techniques is now described.

Parallel Screen Grabbing and Frame Encoding (Frame Rate Booster)

Instead of a straightforward serial process of grabbing a screen image and then encoding it (in a sequential manner), in one embodiment, the host implements a variation whereby the grabbing and encoding processes preferably run in parallel, at least for some of the required frame processing. This means that, while a previous frame is being encoded, the host already starts grabbing the next one so that when the previous frame finishes encoding, the next input frame to the encoder is already available. In this way, the throughput of the encoder is maximized, and in cases when the performance of the grabbing and the encoding part is about the same (which is the case with the resolutions such as 720p and the like), the frame rate can be essentially doubled (compared to performing the steps sequentially).

Figure 5:
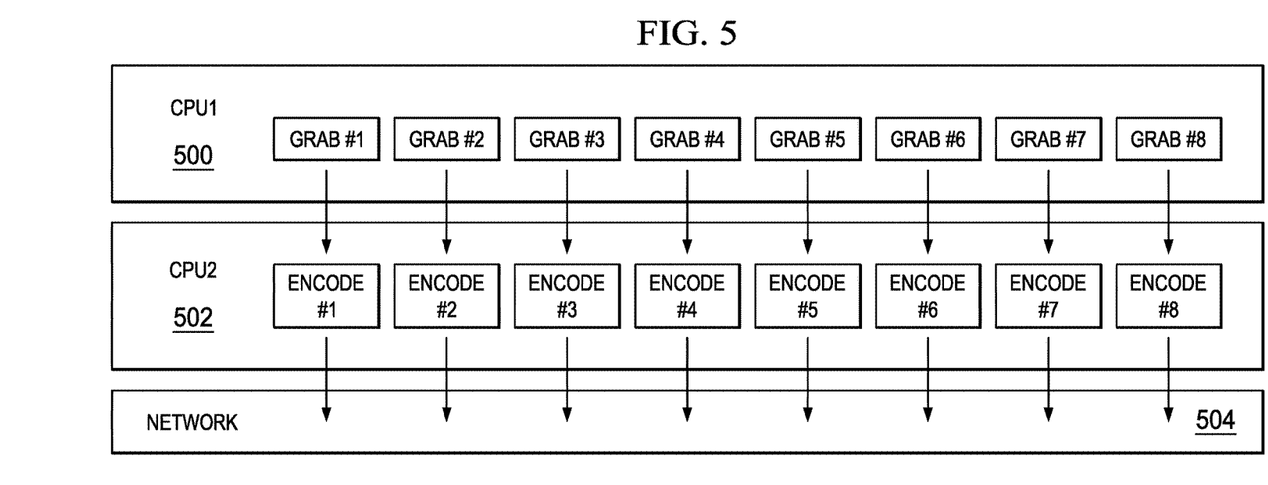
FIG. 5 illustrates a parallel display screen grabbing/encoding technique implemented on a host according to one embodiment of this disclosure.

The parallel screen grabbing and frame encoding technique is illustrated in FIG. 5. In this embodiment, the host comprises a multi-core central processing unit (CPU). From a viewpoint of the operating system, the multi-core CPU architecture appears as multiple CPUs, and thus the OS can associate different operations with each such CPU. To that end, and as illustrated in FIG. 5, CPU1 500 is used to grab the screen frames continuous (i.e., without regard to the encoding of such frames). CPU2 502 is then used to encode each frame, with the results then provided to the network 504 via the network I/O.

With the parallelization of the grabber and encoder processes, and as illustrated in FIG. 5, the technique takes advantage of multi-processing capabilities of modern processors to nearly double the frame rate in common situations. In particular, let $T_{grab}$ be the average time it takes to grab one frame, and let $T_{enc}$ be the average time it takes to encode one frame. For the typical case, these values have the same order of magnitude (with $T_{enc} > T_{grab}$), and it can be assumed that any other processing time is negligible. For the average frame rates, the sequential technique (of the prior art) exhibits an average frame rate $f_{seq} = 1/(T_{grab} + T_{enc}) \approx 1/(2 \ast T_{enc})$; in contrast, for the parallel case, the average frame rate $f_{par} = 1/\max(T_{grab}; T_{enc}) = 1/T_{enc}$. From these equations, it can be seen that the average frame rate in the parallel case $f_{par} \approx 2 \ast f_{seq}$.

In one embodiment, the host software includes a screen grabber thread, and a video encoder thread. The screen grabber thread performs several functions: grabbing the screen image, collecting statistics, rate control, and session recording. The video encoder thread performs the functions of encoding the frame, and sending the encoded frame to the client. In particular, the video encoder calls the codec methods to encode the image (typically YUV encoding) in a currently active screen buffer. Preferably, the screen grabber thread works with a pair of buffers, switching between them as they are consumed by the video encoder thread.

Figure 11:
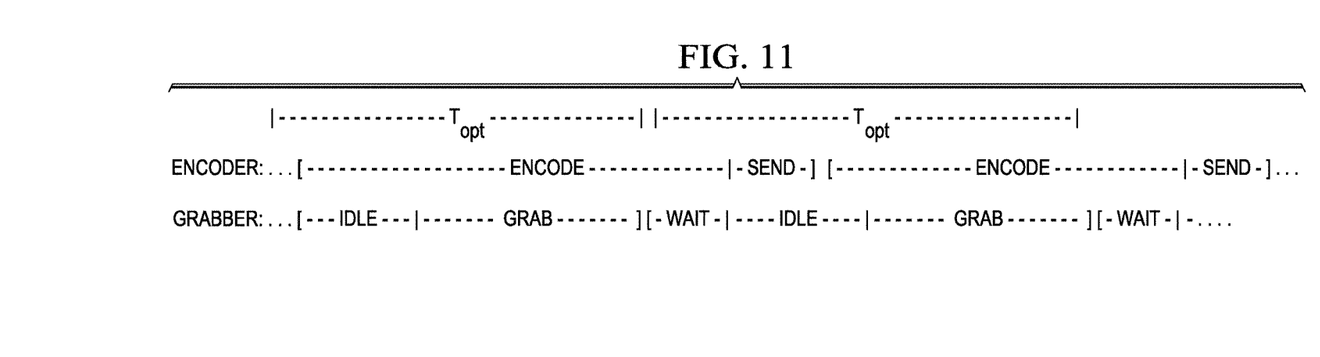
FIG. 11 is a timing diagram illustrating how screen grabber and video encoder routines work cooperatively to parallelize screen grabbing/encoding according to this disclosure.

The screen grabber thread and the video encoder threads execute cooperatively, as follows (©2012, LogMeIn, Inc.):

```
Grabber algorithm:
    <Grab frame>
    Signal encoder thread
    loop until exit signal
        Sleep / Idle for (T_opt − T_grab − T_wait) [1][4]
        <Grab frame> [3]
        Signal encoder thread
        Wait for signal from encoder thread [2]
    end loop
Encoder side:
    loop until exit signal
        Wait for signal from grabber
        <Encode frame>
        Signal grabber
        <Send encoded frame to client>
    end loop
```

Note [1] reflects that the routine tries to time the grabbing to finish just before the encoder becomes available to process a next frame; thus, in the formula $T_{wait}$ is initially zero, and then it is the wait time per note [2] below. Note [2] indicates that the routine measures the time it takes to wait here and stores it in $T_{wait}$. Note [3] indicates that the grab preferably occurs to alternating buffers so that the encoder can work on the previous frame while a current frame is being grabbed. Note [4] indicates that latency control preferably happens during this step.

FIG. 11 is a timing diagram illustrating how the screen grabber and encoding functions operate in parallel according to the above-described algorithms.

Rate Control

Rate control is a heuristic process that tries to adjust the streaming process dynamically to the changing amount of resources available. According to this feature, the host monitoring software measures one or more performance characteristics, such as the time it takes to grab or encode a frame. The client, via the control information, also reports measurements back to the host, such as the time taken to decode a last-received (or some other given) frame. Based on this information, the hosts attempts to limit the CPU and bandwidth usage, e.g., by adjusting the frame rate and the target bitrate of the video, so that resource usage remains optimal (which for all practical purposes means that (i) the user has enough CPU left for running his or her programs, and (ii) the network connection is not blocked).

Figure 6:
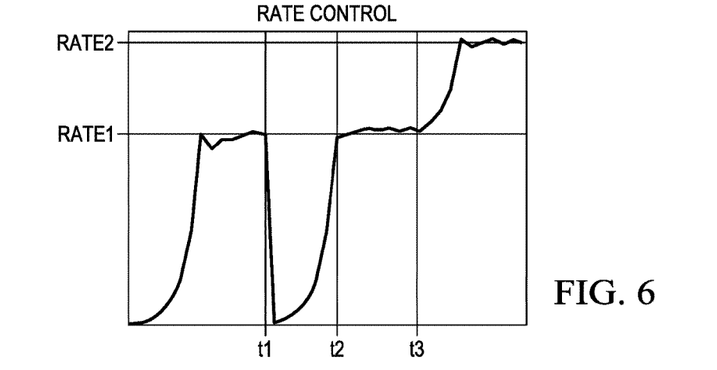
FIG. 6 illustrates a graph of rate versus time illustrating the rate control operation that may be implemented in the control protocol of this disclosure.

As a more concrete example, at any given time, the system calculates the current throughput of the encoding/decoding pipeline described above. This calculation yields a rate value which is sometimes referred to as an optimal frame rate. This optimal frame rate is such that it can be steadily maintained assuming the environment and available resources do not change drastically (e.g., by more than about 10%). As illustrated in FIG. 6, rate1 is the optimal frame rate given the initial environment. There is a quick ramp-up of the actual rate value at the beginning when the host software adjusts the actual rate to the optimal value. Then there is a plateau, which means the actual rate is maintained to be roughly equal to the optimal rate. At time t1, it is assumed that there is a disturbance of the network; thus, the rate falls close to zero in response. The host software returns the rate back to the optimal rate as soon as the network conditions are back to normal, which occurs at time t2 in this example scenario. The ramp-up in this second phrase may be slower than done initially. At t3, a CPU intensive task on this host has finished, so the network I/O is allocated more resources; thus, the optimal rate is now raised to rate2, and the actual rate follows this change as closely as possible.

The primary role of rate control is to find and maintain a configuration of streaming parameters (most importantly, the frame rate, bitrate and quality) such that resources are utilized gracefully, the stream flows steadily, and such that there are no bottlenecks and congestion, and that latency is kept in an acceptable range for interactive use. Based on measuring the details of the processing of a frame, as noted preferably the system determines an optimal frame. In one embodiment, that rate is the inverse of a minimum time it takes to process a frame. Another variable that may be considered is a number of lagging frames (frames that are sent but for which no acknowledgement has been received). A maximum latency requirement may be based on this number.

As a more concrete rate control example, the following values may be measured for each frame: $T_{grab}$ (the time it takes to grab the frame from the host screen), $T_{enc}$ (the time it takes to process and encode the grabbed frame (includes YUV encoding)); and $T_{dec}$ (the time it takes to decode and display a frame on the client). The value $T_{dec}$ is reported back to the host by the client, where the rate control logic takes place. Preferably, each of these values are averaged over a small window (couple of frames) to improve stability. An optimal frame rate is then calculated as follows:

$$f_{opt} = 1/T_{opt}$$

where $T_{opt}$=max $(T_{grab}, T_{enc}, T_{dec})*(1+p)$; and where p represents a safety buffer factor (typically 15%).

For bitrate control, the host monitors to determine whether a send operation (socket send) blocks. If so, the routine may attempt to lower the bitrate of the video. This operation, however, does not affect the frame rate calculation.

Latency control may work as follows. Upon receiving each frame, the client sends back an acknowledge packet to the host. In this way, at all times the host knows how many frames are in transit, i.e., encoded by the host previously but not yet displayed to the user at the client side. To limit frame latency, preferably the host routine limits the number of frames on the wire by blocking processing on the host until the number falls below the maximum latency limit, which is calculated as below. Let $N_{max}$=min $(N_{min}, T_{lat}/T_{opt})$ where $T_{lat}$ is a fixed, constant value representing the maximum desired latency (e.g., 200 ms) and $N_{min}$ is fixed, typically 2.

The above scenarios are merely illustrative of the rate control functionality. This functionality is implemented by the host software utility and its associated monitor routine that provides the necessary inputs (along with the control information returned from the client). In general, the monitor routine thus has the capability of monitoring network congestion and available bandwidth, as well as local CPU load and other variables that may be used to inform the host software of the available frame rate. Once the optimal frame rate or rate profile is generated, the host software seeks to keep the actual frame rate as close to the optimal frame rate or rate profile throughout the streaming process.

Screen Resolution

According to this feature, the remote access client sends to the host its native resolution, and preferably the host sends to the client only a video stream of this size. Thus, e.g., a client such as an Apple iPad may have a screen resolution of 1024×768, whereas a current desktop may have a resolution of 1920×768). Given this potential mismatch, the host adjusts the video stream accordingly. Because (in this scenario) the host does not send the whole (full) resolution screen to the client, the CPU/bandwidth burden on both sides of the connection is reduced.

Zoom/Pan Handling

According to this feature, zoom and pan are handled on the host instead of the client. When the client decides to pan/zoom the screen, an indication to that effect is communicated to the host. This helps with effective utilization of bandwidth, as the host only needs to send the video stream in the resolution of the device (1024×768 on iPad), and not in the resolution of the host, which could be significantly higher.

In particular, mobile clients typically have much smaller resolution screens compared to desktop computers. In a typical RC scenario, only a fraction of the host screen information is visible on the device screen (either due to zooming or cropping). In a conventional remote access setup, the client is responsible for zooming/panning. As a result, a large part of the screen is transferred unnecessarily, and memory is therefore wasted on the device to store those pixels, which are not even visible to the user. This, and according to this feature, the zooming/panning is carried out on the host. This means that the image transferred has the resolution and content exactly matching that of the device's resolution and preferably a current region of the user's interest, thus avoiding waste of bandwidth and device memory. In addition, because a smaller image is decoded on the client, CPU utilization on that device is reduced as well.

Figure 7:
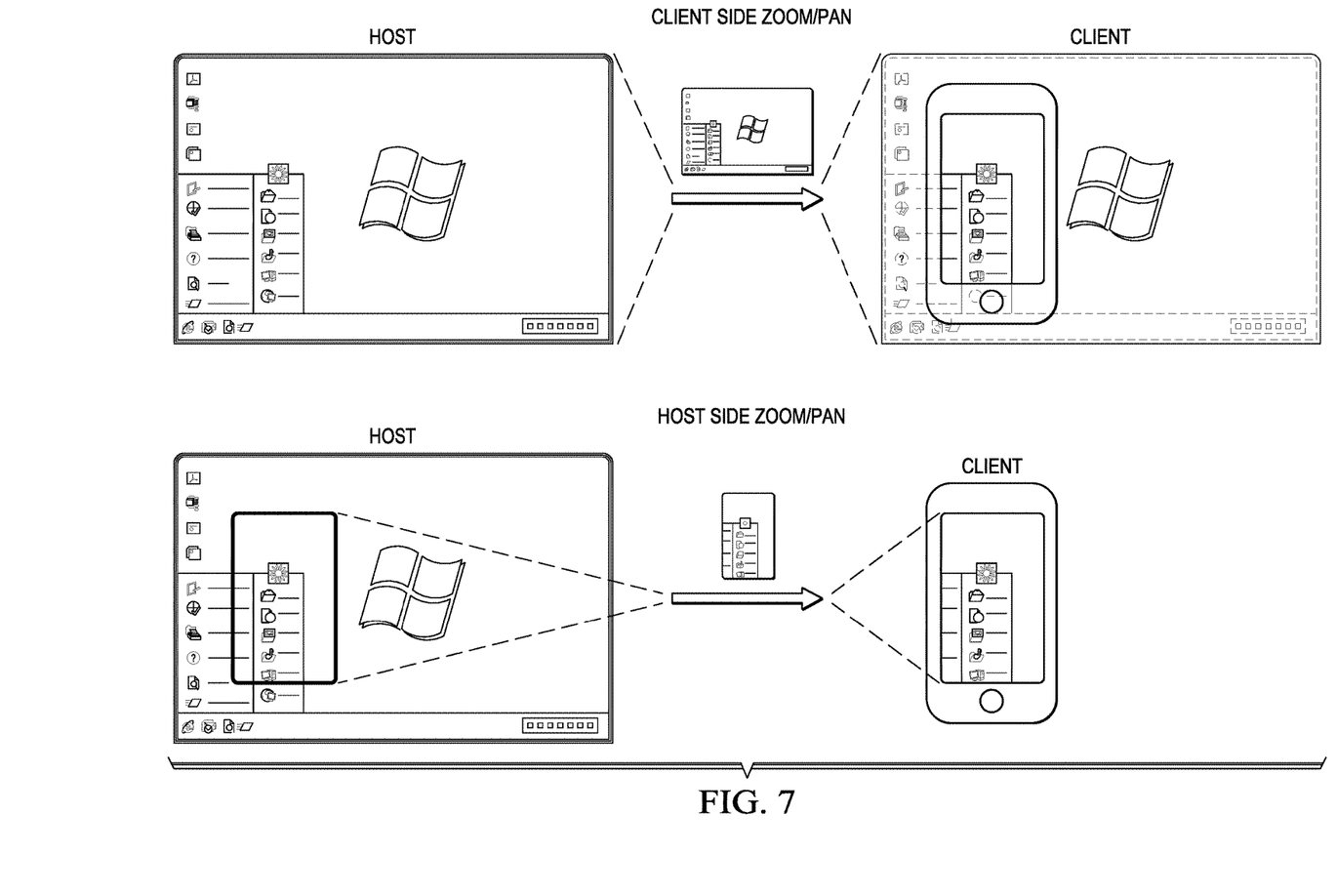
FIG. 7 contrasts the client-side zoom/pan technique of the prior art to the host-side zoom/pan technique of the control protocol of this disclosure.

FIG. 7 illustrates the prior art client-side zoom/pan technique is the upper portion of the drawing. The lower portion of the drawing illustrates the host-side zoom/pan technique of this disclosure.

User Actions

When the client is out of focus ("grayed out"), the host may lower the frame-rate and/or the quality to save CPU on both sides and bandwidth.

The screen image flow may be paused under certain circumstances indicating that the end user at the remote access client cannot "see" the HD stream, such as when a client plug-in window becomes invisible (e.g., minimized), when another display tab becomes active on the display, some other display window obtains the GUI focus, or the like.

Screen Update Patterns

When the same rectangle (the whole screen, for example) is changing for each frame over a given number of frames, the host assumes that the user is watching video and adjusts the parameters/focus, or the like for that scenario. On the other hand, if the host detects that changes are infrequent, or that the changes only cover small areas of the screen, or the like (e.g. when the user is writing an email with the other parts mostly static), the host may lower the frame rate, and then possibly switch locally to better quality (e.g. use pixel perfect screen transfer instead of the video codec).

Parts of the screen which are not updated for some time may be left out from the update, again saving and bandwidth and CPU. These areas may then be re-checked for change periodically and then activated (for inclusion in the frame grab and delivery) when a change is detected.

Figure 8:
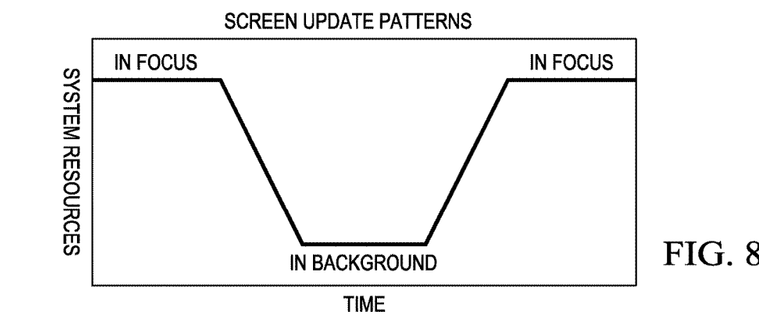
FIG. 8 is a graph that illustrates how system resource utilization is reduced when a screen in focus is shifted to a background position.

FIG. 8 is a graph that illustrates the impact on system resources for a screen that has been shifted from a focus position to a background position. When a screen moves into the background, it need not be updated (or updated as frequently).

These functions may be implemented as follows (e.g., for a host screen that is currently in focus). For each frame, a difference from a previous frame is calculated. These changes may then be populated through all or a portion of the delivery pipeline, and at certain points thereof advantage can be taken by devoting less (or zero) resources to parts that are unchanged. Thus, for example, on the host side, transcoding (e.g., of the RGB bitmap into the YUV color space) only needs to transform changed parts, and the video encoder thread may be controlled to encode only changed parts; on the client side, YUV decoding and drawing can also be restricted to take only changed parts into account. Although there is overhead induced by this processing (on both sides of the connection), they are offset by the gains resulting from the more optimal processing.

Variable Rate Inspection

According to this feature, and based on maintaining a history of the frame differences, certain screen update patterns can be identified. Parts of the screen that are measured to be updated more frequently are then inspected for changes more frequently, whereas the rate of inspection is (or can be) lowered for those parts that are updated less frequently. This operation results in a more optimal utilization of resources, where (given the nature of the content) the "important" parts of the screen get more resources relative to the less-important parts.

Figure 9:
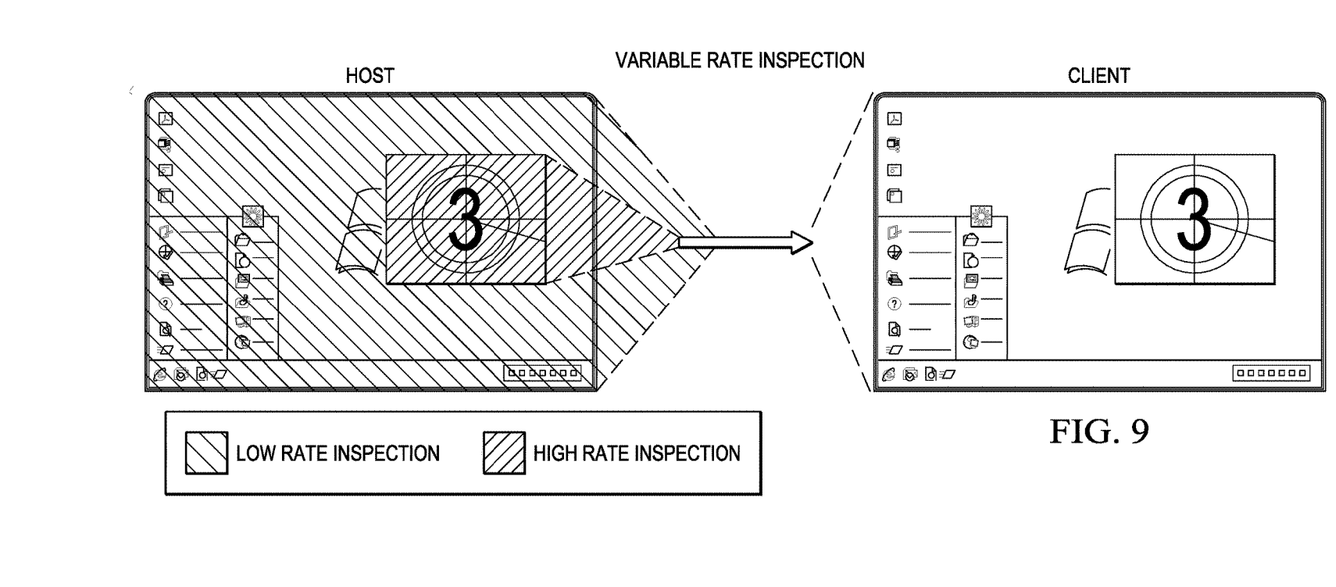
FIG. 9 illustrates a host display screen with portions receiving different inspection rates based on the historical frame differences.

FIG. 9 illustrates a host display screen with portions receiving different inspection rates based on the historical frame differences.

Multiple Streams in Different Frame Rates

Figure 10:
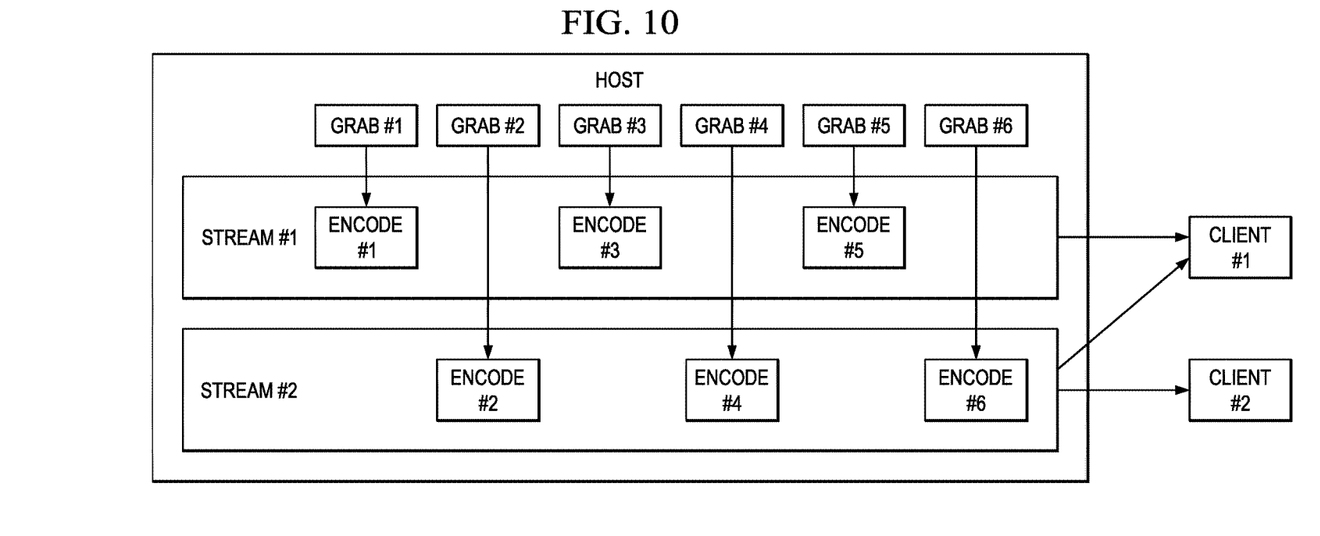
FIG. 10 illustrates how multiple streams in different frame rates may be delivered to multiple clients depending on the resource capabilities at each client.

When multiple clients connect to the same host (e.g., in a collaborative session using a service such as Logmein JoinMe™), it is often the case that clients have significantly different resources and operating capabilities (e.g., CPU power, screen resolution, available bandwidth, or the like). In such cases, it is desirable that each client gets a stream that is tailored to its capabilities. In particular, a client with less bandwidth should get frames with a lower rate than a client with a higher available bandwidth. The challenge here is to minimize the overhead and keep redundant work of the host component to a minimum. According to this feature, and as illustrated in FIG. 10, this operation is achieved by host-side splitting of the stream into two (or more) sub-streams and then encoding each sub-stream independently. In one simple case, Stream#1 contains all odd frames and Stream#2 contains all even frames. Client#1 (in this example) has enough bandwidth for the full rate stream, so it gets both Stream#1 and Stream#2 frames and decodes them in alternating order to reproduce the full stream. Client#2, however, has resources that limited to handle only a half-rate stream, so this client gets only Stream#2. Because the streams are independent, this allows for parallelization of the corresponding encode processes on the host as well, providing a possible slight performance gain thereof.

The techniques provide low latency, a reasonable frame rate, avoid excessive resource utilization (leaving sufficient CPU and bandwidth for the user's other applications), and tolerate/self-adjust in a varying manner to dynamically-changing resources.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The invention claimed is:

1. A method, operative in a host computing device having a display interface, comprising:

capturing, encoding and delivering to a remote access device, as a series of frames, given content, wherein the given content is video and is delivered at a frame rate;

receiving information from the remote access device identifying a current region of interest within the given content; and based on the received information, adjusting the frames output to the remote access device to match the current region of interest;

wherein the frame rate of the video is determined at least in part based on data received from the remote access device, the data identifying a time taken at the remote access device to decode and display a received frame at the remote access device.

2. The method as described in claim 1 wherein the host computing device renders the video using a renderer executing on the host computing device.

3. The method as described in claim 1 wherein the series of frames are captured in parallel.

4. The method as described in claim 3 wherein the given content is delivered by:

monitoring a performance characteristic associated with a resource in the host computing device; and outputting the series of frames to the remote access device while attempting to maintain an optimal frame rate of the video.

5. The method as described in claim 1 wherein the series of frames represent only a given portion of a screen image.

6. The method as described in claim 5 wherein the given portion is a portion that has been determined to have been updated with respect to a prior frame of the series of frames.

7. The method as described in claim 5 wherein the given portion is a portion that has been determined to have been updated with respect to a set of prior frames of the series of frames.

8. The method as described in claim 1 wherein the frames output to the remote access device are sized to match a display resolution associated with a display screen of the remote access device.

9. The method as described in claim 4 wherein the performance characteristic is one of: a time to encode a frame, and a time to grab a frame.

10. The method as described in claim 4 wherein the performance characteristic is CPU utilization in the host computing device.

11. The method as described in claim 1 further including adjusting an encoding of the series of frames.

* * * * *